United States Patent
Reihs et al.

(10) Patent No.: US 6,428,895 B1
(45) Date of Patent: Aug. 6, 2002

(54) STABLE ADHESIVE COMPOSITE MATERIAL MADE OF POLYURETHANE AND OF ANOTHER THERMOPLASTIC MATERIAL, A PROCESS FOR ITS PRODUCTION AND A METHOD FOR ITS USE IN MOTOR VEHICLES

(75) Inventors: Karsten Reihs; Werner Rasshofer, both of Köln; Holger Warth, Dormagen; Dirk Wegener, Monheim; Manfred Schmidt; Peter Heitkämper, both of Dormagen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/919,384

(22) Filed: Jul. 31, 2001

Related U.S. Application Data

(62) Division of application No. 09/571,226, filed on May 16, 2000, now Pat. No. 6,296,908.

(30) Foreign Application Priority Data

May 26, 1999 (DE) .......................................... 199 24 092

(51) Int. Cl.[7] ............................. B32B 7/10; B32B 27/08
(52) U.S. Cl. ................ 428/412; 428/423.1; 428/425.5; 428/423.7; 428/475.5
(58) Field of Search ............................. 428/412, 423.1, 428/423.5, 423.7, 475.5

(56) References Cited

U.S. PATENT DOCUMENTS

| | | | | |
|---|---|---|---|---|
| 3,535,197 A | * | 10/1970 | Fishbein et al. | 156/272.2 |
| 4,039,517 A | | 8/1977 | Hamamura et al. | 260/77.5 TB |
| 4,775,558 A | | 10/1988 | Haas et al. | 427/373 |
| 5,756,196 A | * | 5/1998 | Chao et al. | 428/319.3 |

FOREIGN PATENT DOCUMENTS

| | | | |
|---|---|---|---|
| EP | 83017 | | 7/1983 |
| EP | 573206 | | 12/1993 |
| EP | 741152 | | 11/1996 |
| EP | 1010719 | * | 6/2000 |
| GB | 1326298 | | 8/1973 |
| GB | 1436665 | | 5/1976 |
| JP | 62-250032 A2 | * | 10/1987 |
| JP | 08-052831 | * | 2/1996 |

* cited by examiner

Primary Examiner—Erma Cameron
(74) Attorney, Agent, or Firm—Joseph C. Gil; N. Denise Brown

(57) ABSTRACT

The present invention relates to composite materials made of at least one composite layer of a polyurethane and of a second composite layer which is directly bonded to the first layer and which consists of a thermoplastic material that is different from the polyurethane of layer A). The polyurethane material of layer A) is characterized by a residual content of free reaction components containing ether groups of no more than 400 ppm, and preferably of no more than 100 ppm. The invention also relates to a process for the production of these composite materials and to a method of their use as materials in motor vehicles.

8 Claims, 2 Drawing Sheets

STABLE ADHESIVE COMPOSITE MATERIAL MADE OF POLYURETHANE AND OF ANOTHER THERMOPLASTIC MATERIAL, A PROCESS FOR ITS PRODUCTION AND A METHOD FOR ITS USE IN MOTOR VEHICLES

CROSS-REFERENCE TO RELATED APPLICATIONS

This application is a divisional application of U.S. Application Ser. No. 09/571,226, filed on May 16, 2000, now U.S. Pat. No. 6,296,908.

BACKGROUND OF THE INVENTION

The present invention provides composite materials comprising at least two different plastic material layers directly bonded to one another, of which one layer consists of polyurethane and the layer directly bonded to it consists of a different thermoplastic plastic material.

It is known that composites comprising a thermoplastic material and a polyurethane, in particular a polyurethane foam, do not exhibit adequate bonding adhesion. This bonding adhesion can be improved by the use of adhesion-promoting layers. This approach is, however, undesirable for applications in the automobile industry, where such composite materials are increasingly being employed, because the required working-tip and recycling processes entail the use of materials which preferably differ as little as possible.

Therefore, the object of the present invention was to adequately improve the bonding adhesion between a layer made of a polyurethane and a layer directly bonded thereto made of another thermoplastic material.

SUMMARY OF THE INVENTION

This object is achieved according to the invention by the provision of a composite material consisting of at least two layers directly bonded to one another, comprising A) at least one layer comprising a polyurethane formed by the reaction of (a) at least one polyisocyanate, with (b) at least one isocyanate-reactive component, and B) at least one other (or second) layer which is directly bonded to the polyurethane layer A), and which comprises a thermoplastic plastic material that is different from the polyurethane layer A), wherein layer A) has a residual content of reaction components containing ether groups of no more than 400 ppm, and preferably of no more than 100 ppm, which result from the polyurethane preparation.

This content of reaction components which contain ether groups are isocyanate-reactive components which did not react with the isocyanate component in the preparation or formation of the polyurethane which forms layer A).

The polyurethanes or polyurethane ureas used in accordance with the present invention as layer A) are obtained by the reaction of one or more polyisocyanates, with one or more polyfunctional compounds containing isocyanate-reactive hydrogen atoms, preferably polyols.

DETAILED DESCRIPTION OF THE INVENTION

Figure 1:
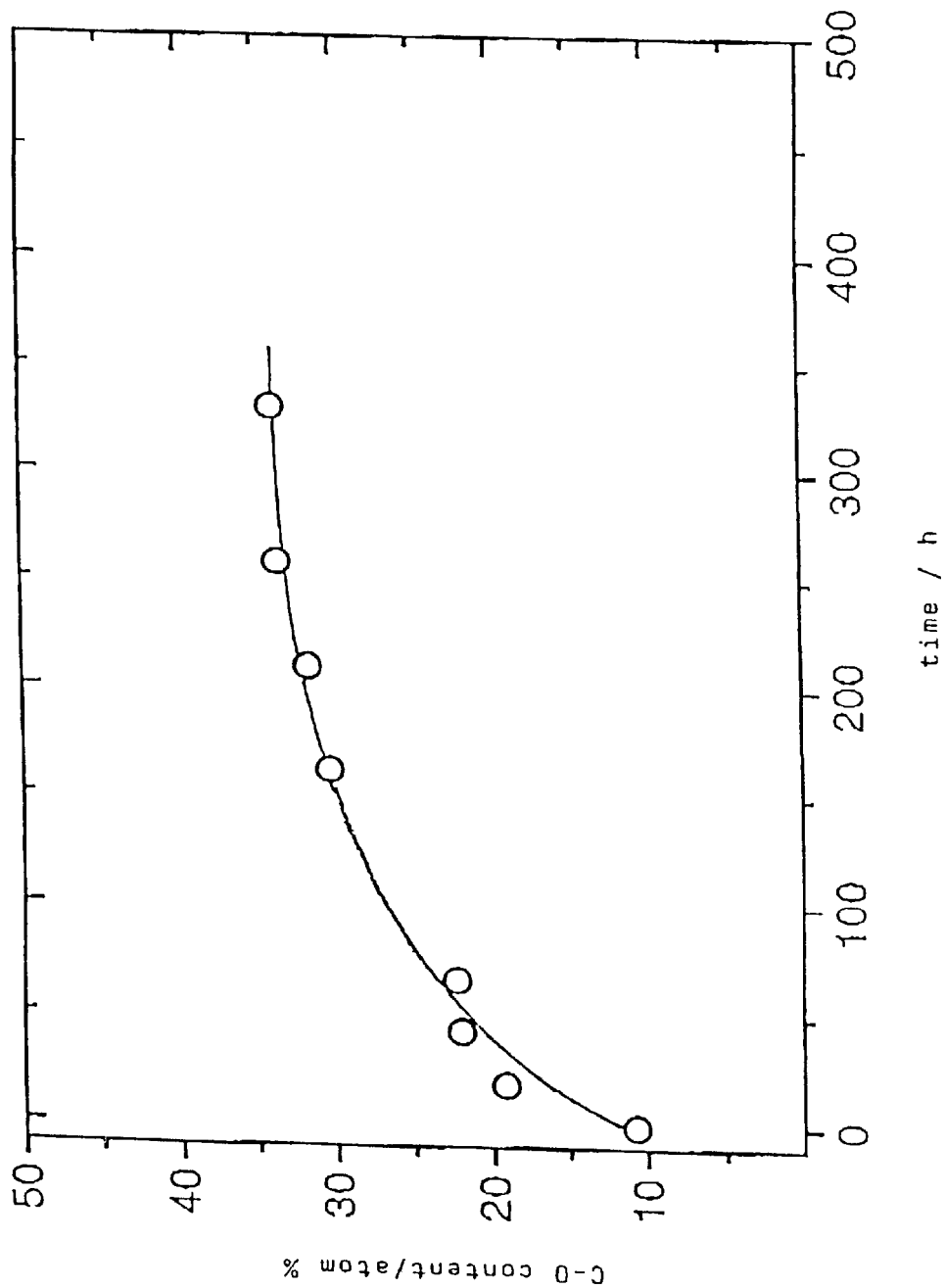
FIG. 1 illustrates the increase in the concentration of polyether on the separated substrate surface over time as ascertained by x-ray photoelectron spectroscopy (XPS).

Suitable polyisocyanates are preferably those which are known in polyurethane chemistry and which are conventionally used therein. In particular, these include aromatic polyisocyanates such as, for example, 2,4-diisocyanatotoluene, and technical mixtures thereof with 2,6-diisocyanato-toluene, 4,4'-diisocyanatodiphenylmethane, and mixtures thereof with the corresponding 2,4'- and 2,2'-isomers, polyisocyanate mixtures of the diphenylmethane series, those which can be obtained in known per se manner by phosgenation of aniline/formaldehyde condensation, the biuret- or isocyanate-containing modification products of these technical polyisocyanates, and, in particular, NCO prepolymers of the afore-mentioned type which are based on these technical polyisocyanates and on the simple polyols and/or polyether polyols and/or polyester polyols of the type described below as being suitable polyfunctional components containing isocyanate-reactive hydrogen atoms, as well as any mixtures of such isocyanates, provided that they are sufficiently stable upon storage.

Among the high-molecular weight, modified polyisocyanates, the prepolymers which are known in polyurethane chemistry, which have terminal isocyanate groups and have number average molecular weights in the range of 400 to 10,000 g/mol, preferably 600 to 8,000 g/mol and more preferably of 800 to 5,000 g/mol, are of particular interest. These compounds are prepared in the known manner per se by reacting excess quantities of one or more simple polyisocyanates, of the type cited above as examples, with one or more organic compounds containing at least two groups which are capable of reacting with isocyanate groups, in particular, organic polyhydroxyl compounds. Suitable polyhydroxyl compounds of this kind may be simple polyhydric alcohols having number average molecular weights in the range of 62 to 599 g/mol, preferably 62 to 200 g/mol, such as, for example, ethylene glycol, trimethylolpropane, 1,2-propanediol, 1,4-butanediol or 2,3-butanediol, and relatively high-molecular weight polyether polyols and/or polyester polyols of the kind known per se in polyurethane chemistry, having number average molecular weights of 600 to 8,000 g/mol, preferably 800 to 4,000 g/mol, and containing at least two, generally 2 to 8, preferably 2 to 4 primary and/or secondary hydroxyl groups. One may, of course, also use those NCO prepolymers which have been obtained, for example, from low-molecular weight (number average) polyisocyanates of the type cited above by way of example, and from less preferred compounds possessing groups which are reactive with isocyanate groups, such as, for example, polythioether polyols, hydroxyl-containing polyacetals, polyhydroxypolycarbonates, hydroxyl-group containing polyesteramides or hydroxyl-group containing copolymer of olefinically unsaturated compounds.

Compounds which are suitable for the preparation of NCO prepolymers and which possess groups, and in particular, hydroxyl groups, which are reactive with isocyanate groups include, for example, the compounds as disclosed in U.S. Pat. No. 4,218,543, the disclosure of which is herein incorporated by reference. During the production of the NCO prepolymers, these compounds which possess groups which are reactive with isocyanate groups are caused to react with simple polyisocyanates of the kind given above as examples, with an excess of NCO being maintained The NCO prepolymers generally have an NCO content of 10 to 25% wt. by weight, preferably 15 to 22% by weight. It follows from this that, in the context of the present invention, "NCO prepolymers" and "prepolymers having terminal isocyanate groups" are understood to comprise both the reaction products as such and mixtures thereof with excess quantities of unreacted starting polyisocyanates, which are frequently also referred to as "semi-prepolymers".

The polyisocyanate component has an average functionality of 2 to 3, preferably 2.3 to 2.7.

In order to establish a given NCO content in the isocyanate component, it may be useful to mix together portions of crude MDI and an NCO prepolymer. The proportion of material of high functionality (functionality >4) contained in the crude MDI can readily be tolerated, provided that the average functionality of 3 up to the isocyanate component is not exceeded.

Suitable aliphatic diols include those characterized by an OH value of at least 200 mg KOH/g, preferably at least 500 mg KOH/g and include the cross-linked chain-extenders which are conventionally used in polyurethane chemistry, such as ethylene glycol, diethylene glycol, propylene glycol, dipropylene glycol, 1,4-butanediol, 1,3-propanediol. Diols which have an improved compatibility with the polyols of the polyfunctional, isocyanate-reactive component are preferred. Examples of these include, compounds such as 1,4-butanediol, 1,3-butanediol, 2,3-butanediol, 2-methyl-1, 3-propanediol. It is, of course, also possible to use the aliphatic diols as mixtures with each other.

Other suitable polyfunctional, isocyanate-reactive components include those polyols having an average OH number of 5 to 500 mg KOH/g and an average functionality of 2 to 4. Those polyols having an average OH number of 10 to 50 mg KOH/g and an average functionality of 2.7 to 3 are preferred. Examples of such polyols include polyhydroxypolyethers, which are known in polyurethane chemistry and are attainable by the alkoxylation of suitable starter molecules such as, for example, ethylene glycol, diethylene glycol, 1,4-dihydroxybutane, 1,6-dihydroxyhexane, dimethylolpropane, glycerol, pentaerythritol, sorbitol or saccharose. Compounds which can also function as suitable starter molecules include, for example, ammonia, or amines such as ethylene-diamine, hexamethylenediamine, 2,4-diaminotoluene or aniline, aminoalcohols, or phenols such as, for example, bisphenol A. The alkoxylation can be carried out, for example, using propylene oxide and/or ethylene oxide in any order.

Polyester polyols which are also suitable to be used as polyfunctional isocyanate-reactive components include those of the type obtainable in known manner per se, by the reaction of one or more low-molecular weight alcohols with one or more polybasic carboxylic acids such as, for example, adipic acid, phthalic acid, hexahydrophthalic acid or tetrahydrophthalic acid, or with the anhydrides of these acids, preferably, provided that the viscosity of the isocyanate-reactive component is not too high. A preferred polyol, which has ester groups, is castor oil. Preparations which comprise castor oil, such as those which can be obtained by dissolving resins, for example, aldehydeketone resins, are also suitable, as are modifications of castor oil and polyols based on other natural oils.

Suitable compounds also include, for example, those high-molecular weight polyhydroxypolyethers in which high-molecular weight polyadducts or polycondensates or polymers are present in finely dispersed, dissolved or grafted form. Such modified polyhydroxyl compounds are generally obtained, for example, when polyaddition reactions (for example, reactions between polyisocyanates and amino-functional compounds) or polycondensation reactions (for example, between formaldehyde and phenols and/or amines) are allowed to proceed in situ in the hydroxyl-group containing compounds. Such processes are known and described in, for example, DE-AS 1,168,075 and 1,280,142, as well as in DE-A 2,324,134, 2,423,984, 2,512,385, 2,513, 815, 2,550,796, 2,550,797, 2,550,833, 2,550,882, 2,633,293 and 2,639,254. According to the processes described in, for example, U.S. Pat. No. 3,869,413, the disclosure of which is herein incorporated by reference, or in DE-A 2,550,860, it is even possible to mix a prepared aqueous polymer dispersion with a polyhydroxyl compound, and subsequently, to remove the water from the mixture.

Polyhydroxyl compounds modified by vinyl polymers, such as those which are obtained by, for example, the polymerization of styrene and acrylonitrile in the presence of polyethers (as described in, for example, U.S. Pat. Nos. 3,383,351, 3,304,273, 3,523,093, and 3,110,695, the disclosures of which are herein incorporated by reference; DE-A 1,152,5369), or of polyether carbonate polyols (as described in DE-PS 1,769,795, and in U.S. Pat. No. 3,637,909, the disclosure of which is herein incorporated by reference), are also suitable for the preparation of polyurethanes. If polyether polyols are used which have been modified, in accordance with DE-A 2,442,101, 2,844,922 and 2,646,141, by graft polymerization with vinyl phosphonates, and, optionally, (meth)acrylonitrile, (meth)acrylamide or OH-functional (meth)acrylic esters, plastics having a special flame resistance are produced.

Representatives of the compounds mentioned above to be used as polyfunctional isocyanate-reactive compounds are described in, for example, High Polymers, Vol. XVI, "Polyurethane Chemistry and Technology", by Saunders-Frisch, Interscience Publishers, New York, London, Volume I, 1982, pages 32–42 and pages 44–54 and Volume II, 1984, pages 5–6 and 198–199, and in Kunststoff-Handbuch, Volume VII, Carl Hanser Verlag, Munich, 1983, for example, on pages 45–61.

Mixtures of the compounds listed may, of course, also be used.

The restriction of the average OH number and of the average functionality of the isocyanate-reactive component results, in particular, from the increasing embrittlement of the resulting polyurethane. In principle, however, the person of ordinary skill in the art knows the possible ways of influencing the polymeric/physical properties of polyurethanes, so that NCO component, the aliphatic diol and the polyol can be advantageously matched or coordinated with one another in a favorable manner.

The composite layer A) may be foamed or in solid form such as, for example, a paint or coating.

All known per se auxiliary substances and additives such as, for example, separating agents, blowing agents, fillers, catalysts and flameproofing agents can be used.

Auxiliary substances and additives which may optionally be used include:
a) water and/or highly volatile inorganic or organic substances as blowing agents. Suitable organic blowing agents include, for example, acetone, ethyl acetate, halogen-substituted alkanes such as methylene chloride, chloroform, ethylidene chloride, vinylidene chloride, monofluorotrichloro-methane, chlorodifluoro-methane, dichlorodifluoromethane, as well as butane, hexane, hexane or diethyl ether; suitable inorganic blowing agents include, for example, air, $CO_2$, or $N_2O$. A blowing action can also be achieved by adding compounds which decompose at temperatures above room temperature with the release of gases such as, for example, nitrogen. Examples of such compounds include azo compounds such as, for example, azodicarbonamide or azobisisobutyronitrile. Further examples of blowing agents and details regarding the use of blowing agents are given in Kunststoff-Handbuch, Volume VII, edited by Vieweg and Höchtlen, Carl Hanser Verlag, Munich, 1966, for example, on pages 108 and 109, 453 to 455 and 507 to 510.

b) Catalysts of the type known per se include, for example, tertiary amines, such as trimethylamine, tributylamine, N-methylmorpholine, N-ethylmorpholine, N,N,N',N'-tetramethylethylenediamine, pentamethyldiethylenetriamine and higher homologues (DE Offenlegungsschriften 2,624,527 and 2,624,524), 1,4-diazabicyclo-[2.2.2]octane, N-methyl-N'-(dimethylaminoethylpiperazine, bis(dimethyl-aminoalkyl)piperazine (DE Offenlegungsschriften 2,737,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N'-dimethyl-β-phenylethylamine, 1,2-dimethylimidazole, 2-methylimidazole, monocyclic and bicyclic amidines (DE, Offenlegungsschrift 1,720,633), bis(dialkylamino)alkyl ether (as described in U.S. Pat. No. 3,330,782 the disclosure of which is herein incorporated by reference, DE-Auslegungsschrift 1,030,558, DE Offenlegungsschriften 1,804,361 and 2,618,280) as well as tertiary amines containing amide groups (preferably formamide groups) as in DE Offenlegungsschriften 2,523,633 and 2,732,292). Known per se Mannich bases made from secondary amines, such as dimethylamine, and from aldehydes, preferably formaldehyde, or ketones such as acetone, methyl ethyl ketone or cyclohexanone, and from phenols, such as phenol, nonyl phenol or bisphenol, are also suitable catalysts.

Tertiary amine catalysts possessing hydrogen atoms which are active towards isocyanate groups are, for example, triethanolamine, triisopropyl-amine, N-methyldiethanolamine, N-ethyldiethanolamine, N,N-dimethyl-ethanolamine, their reaction products with alkylene oxides such as propylene oxide and/or ethylene oxide as well as secondary-tertiary amines as in DE Offenlegungsschrift 2,732,292.

Other suitable catalysts include the silaamines containing carbon-silicon bonds, such as are described, for example, in DE 1,229,290 (believed to correspond to U.S. Pat. No. 3,620,984, the disclosure of which is herein incorporated by reference), for example, 2,2,4-trimethyl-2-silamorpholine and 1,3-diethylaminomethyltetramethyldisiloxane Also suitable to be used as catalysts include the nitrogen-containing bases such as tetraalkylammonium hydroxides, as are alkali metal hydroxides such as sodium hydroxide, alkali metal phenolates such as sodium phenolate or alkali metal alkoxides such as sodium methylate. Hexahydrotriazines can also he used as catalysts (DE Offenlegungsschrift 1,769,043).

The reaction between NCO groups and isocyanate-reactive hydrogen atoms is also greatly accelerated by lactam and azalactams, with an associative component first of all being formed between the lactam and the compound containing isocyanate-reactive hydrogen atoms. Such associative compounds and their catalytic action are described in DE Offenlegungsschriften 2,062,286, 2,062,289 and 2,117,576 (believed to correspond to U.S. Pat. No. 3,758,444, the disclosure of which is herein incorporated by reference), 2,129,198, 2,330,175 and 2,330,211.

Organometallic compounds, and in particular, organotin compounds, can also be used as catalysts. Besides sulfur-containing compounds such as dioctyltin mercaptide (as described in DE Auslegeschrift 1,769,367, and in U.S. Pat. No. 3,645,927, the disclosure of which is herein incorporated by reference), suitable organotin compounds are chiefly tin(II) salts of carboxylic acids such as, for example, tin(II) acetate, tin(II) octoate, tin(II) ethylhexoate and tin(II) laurate, and the tin(IV) compounds such as, for example, dibutyltin oxide, dibutyltin dichloride, dibutyltin diacetate, dibutyltin dilaurate, dimethyltin dilaurate, dibutyltin maleate and dioctyltin diacetate.

All the above-mentioned catalysts may, of course, be used as mixtures. Of particular interest here are combinations of organometallic compounds and amidines, aminopyridines or hydrazinopyridines (as described in, for example, DE Offenlegungsschriften 2,434,185, 2,601,802 and 2,603,834).

Further representatives of catalysts to be used according to the invention and details regarding the mechanism of action of the catalysts are described in, for example, Kunststoff-Handbuch, Volume VII, edited by Vieweg and Höchtlen, Carl Hanser Verlag, Munich, 1966, on pages 96 to 102.

The catalysts are generally used in a quantity of between about 0.001 and 1 10% by wt., based on the total quantity of compounds having at least two hydrogen atoms which are reactive with isocyanates.

c) Surface-active additives, such as emulsifiers and foam stabilizers can also be used in the production of layer A). Examples of suitable emulsifiers are the sodium salts of castor oil sulfonates or salts of fatty acids and amines, such as oleic acid diethylamine or stearic acid diethanolamine. Alkali metal salts or ammonium salts of sulfonic acids such as, for instance, dodecylbenzenesulfonic acid or dinaphthyl-methanesulfonic acid, or of fatty acids such as ricinoleic acid or of polymeric fatty acids can also be used as surface-active additives.

Suitable foam stabilizers typically comprise polyether siloxanes, especially water-soluble representatives thereof. These compounds are generally built up in such a way that a copolymer of ethylene oxide and propylene oxide is bonded to a polydimethylsiloxane group. Such foam stabilizers are described, for example, in U.S. Pat. Nos. 2,834,748, 2,917,480 and 3,629,308, the disclosures of which are herein incorporated by reference. Polysiloxane-polyoxyalkylene copolymers which are multiple branched via allophanate groups as described in DE Offenlegungsschrift 2,558,523 are of particular interest.

d) Reaction inhibitors such as, for example, acid-reacting substances such as hydrochloric acid or organic acid halides, also cell regulators of the kind known per se such as, for example, paraffins, fatty alcohols or dimethylpolysiloxanes, as well as pigments or dyes and flameproofing agents of the kind known per se such as, for example, tris(chloroethyl) phosphate, tricresyl phosphate or ammonium phosphate and ammonium polyphosphate, also stabilizers against the effects of aging and weathering, plasticizers, and substances which exert a fungistatic and bacteriostatic effect, as well as fillers such as barium sulfate, kieselguhr, carbon black and prepared chalk may be included in the polyurethane forming reaction mixture which is used as layer A) of the composites of the invention.

Other examples of surface-active additives and foam stabilizers which can optionally to be used in the invention, as well as of cell regulators, reaction inhibitors, stabilizers, flame retardants, plasticizers, dyes and fillers, and of fungistatic and bacteriostatic substances, together with details regarding the method of use and mode of action of these additives, are given in Kunststoff-Handbuch, Volume VII, edited by Vieweg and Höchtlen, Carl Hanser Verlag, Munich, 1966, for example, on pages 103–113.

All the known thermoplastics are suitable for use as thermoplastic plastic materials which comprises layer B) of the invention. Thermoplastic polyolefins are preferred and include compounds such as, for example, polypropylenes or polyethylenes, polycarbonates, polyester carbonates, styrene copolymers, rubber-containing graft styrene copolymers, such as ABS polymers, polyamides and/or thermoplastic mixtures thereof.

The following polymers are particularly suitable as the thermoplastic plastic material of layer B):

Polyolefins such as polyethylene of high density and of low density, i.e. those having densities in the range of from 0.91 g/cm$^3$ to 0.97 g/cm$^3$, which can be prepared by known processes (Ullmann (4th Ed.) 19, page 167 et seq., Winnacker-Kückler (4th Ed.) 6, 353 to 367, Elias and Vohwinkel, Neue Polymere Werkstoffe für die industrielle Anwendung, Munich, Hanser, 1983.)

Polypropylenes having weight average molecular weights of 10,000 g/mol to 1,000,000 g/mol, and which can be prepared by known processes, are also suitable. Methods for preparing these are described in, for example, Ullmann (5th Ed.) A10, page 615 et seq.; Houben-Weyl E20/2, page 722 et seq.; Ullmann (4th Ed.) 19, page 195 et seq.; and Kirk-Othmer (3rd Ed.) 16, page 357 et seq.

Copolymers of the above-mentioned olefins, or with other α-olefins, are also suitable to be used as thermoplastic plastics materials for layer B) of the present invention. Some suitable examples include:

polymers of ethylene with butene, hexene and/or octene;
  EVAs (ethylene-vinyl acetate copolymers);
  EEAs (ethylene-ethyl acrylate copolymers);
  EBAs (ethylene-butyl acrylate copolymers);
  EASs (acrylic acid-ethylene acrylate copolymers);
  EVKs (ethylene-vinyl carbazole copolymers);
  EPBs (ethylene-propylene block copolymers);
  EPDMs (ethylene-propylene-diene copolymers);
  PBs (polybutylenes);
  PMPs (polymethylpentenes);
  PIBs (polyisobutylenes);
  NBRs (acrylonitrile-butadiene copolymers);
  polyisoprenes;
  methyl-butylene copolymers;
  and
  isoprene-isobutylene copolymers;

Methods of preparation of such polymers are described in, for example, Kunststoff-Handbuch, Volume IV, Munich, Hanser Verlag, Ullmann (4th Ed.) 19, page 167 et seq.; Winnacker-Kückler (4th Ed.) 6, 353 to 367; Elias and Vohwinkel, Neue Polymere Werkstoffe, Munich, Hanser, 1983; and Franck and Biederbick, Kunststoff Kompendium Würzburg, Vogel, 1984.

Thermoplastic plastic materials which according to the invention are suitable for use as the composite layer B) also include thermoplastic, aromatic polycarbonates, and in particular, those based on diphenols corresponding to formula (I):

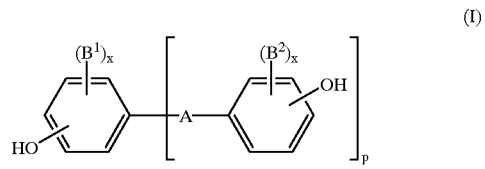

wherein:

A represents a single bond, $C_1$-$C_5$ alkylene radical, a $C_2$-$C_5$ alkylidene radical, a $C_5$-$C_6$ cycloalkylidene radical, —S—, —$SO_2$—, —O—, —CO—, or a $C_6$-$C_{12}$ arylene radical, which can optionally be condensed with other aromatic rings containing hetero atoms;

$B^1$ and $B^2$: each independently represents a $C_1$-$C_8$-alkyl radical, a $C_6$-$C_{10}$ aryl radical, and preferably a phenyl radical, a $C_7$-$C_{12}$ aralkyl radical, and preferably a benzyl radical, a halogen atom, and preferably chlorine or bromine;

each x: independently represents 0, 1 or 2;
and
p represents 1 or 0;
or an alkyl-substituted dihydroxyphenylcycloalkane corresponding to formula (II),

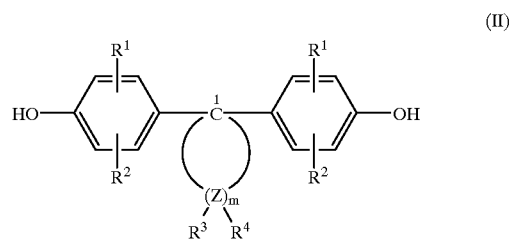

wherein $R^1$ and $R^2$ each independently represent a hydrogen atom, a halogen atom, and preferably chlorine or bromine, a $C_1$-$C_8$ alkyl radical, a $C_5$ cycloalkyl radical, a $C_6$-$C_{10}$ aryl radical, and preferably a phenyl radical, and a $C_7$-$C_{12}$ aralkyl radical, preferably a phenyl $C_1$-$C_4$ alkyl radical, and in particular a benzyl radical;

m represents an integer from 4 to 7, preferably 4 or 5;

$R^3$ and $R^4$ are each independently selected for each Z and each represents, independently of one another, a hydrogen atom, a $C_1$-$C_6$ alkyl radical, and preferably a hydrogen atom, a methyl radical or an ethyl radical; and Z represents carbon, with the proviso that on at least one Z atom, $R^3$ and $R^4$ simultaneously denote an alkyl radical.

Example of suitable diphenols corresponding to formula (I) above include, for example, hydroquinone, resorcinol, 4,4'-dihydroxydiphenyl, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dibromo-4-hydroxyphenyl)propane.

The preferred diphenols corresponding to formula (I) are 2,2-bis(4-hydroxyphenyl)-propane, 2,2-bis(3,5-dichloro-4-hydroxyphenyl)propane and 1,1-bis(4-hydroxyphenyl)cyclohexane.

The preferred diphenols corresponding to formula (II) are the dihydroxydiphenylcycloalkanes having 5- and 6-ring C atoms in the cycloaliphatic group [(m=4 or 5 in formula (II)], such as, for example, the diphenols corresponding to the formulae.

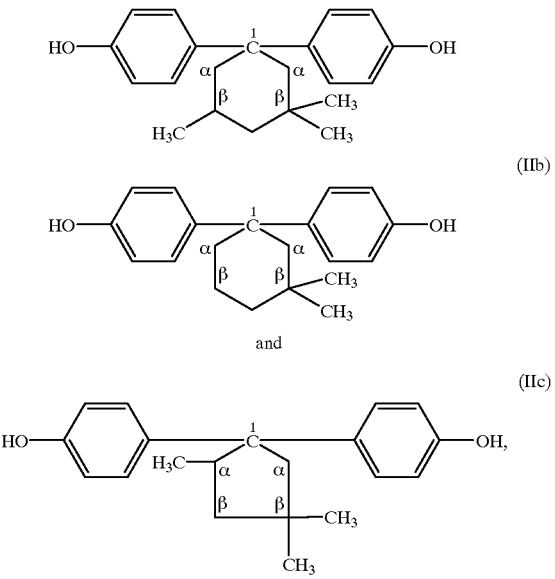

wherein:

1,1-bis(4-hydroxyphenyl)-3,3,5-trimethylcyclohexane (formula (IIa)) is particularly preferred.

The polycarbonates which are suitable according to the invention may be branched in known manner. To be more precise, they are preferably branched by the incorporation of 0.05 to 2.0 mol %, based on the sum of the diphenols used, of compounds which are trifunctional or more than trifunctional such as, for example, those compounds having three or more than three phenolic groups. Examples of suitable compounds are phloroglucinol,
4,6-dimethyl-2,4,6-tri(4-hydroxyphenyl)heptene-2,
4,6-dimethyl-2,4,6-tri(4-hydroxyphenyl)heptene,
1,3,5-tri(4-hydroxyphenyl)benzene,
1,1,1-tri(4-hydroxyphenyl)ethane,
tri(4-hydroxyphenyl)phenylmethane,
2,2-bis(4,4-bis(4-hydroxyphenyl)cyclohexylpropane,
2,4-bis(4-hydroxyphenyl)isopropyl)phenol,
2,6-bis(2-hydroxy-5'-methylbenzyl)-4-methylphenol,
2-(4-hydroxyphenyl)-2-(2,4-dihydroxyphenyl)propane,
hexa(4-(4-hydroxyphenylisopropyl)phenyl)ortho-terephthalic ester,
tetra(4-hydroxyphenyl)methane,
tetra(4-(4-hydroxyphenylisopropyl)phenoxy)methane and
1,4-bis(4'-,4''-dihydroxytriphenyl)methyl)benzene.

Some other trifunctional compounds which can be used include 2,4-dihydroxybenzoic acid, trimesic acid, cyanuric chloride and 3,3-bis(3-methyl-4-hydroxyphenyl)-2-oxo-2,3-dyhydroindole.

In addition to bisphenol A homopolycarbonate, the preferred polycarbonates are the copolycarbonates of bisphenol A with up to 15 mol %, based on the molar sum of diphenols, of 2,2-bis(3,5-dibromo-4-hydroxy-phenyl)propane.

The aromatic polycarbonates to be used for the production of layer B) of the composite may be partially replaced by aromatic polyester carbonates.

Aromatic polycarbonates and/or aromatic polyester carbonates suitable as a thermoplastic plastic material for layer B) are known in the literature, and/or can be prepared by methods known in the literature. For the preparation of aromatic polycarbonates, see, for example, Schnell, "Chemistry and Physics of Polycarbonates", Interscience Publishers, 1964.

Aromatic polycarbonates and/or aromatic polyester carbonates can be prepared, for example, by the reaction of diphenols with carbonyl halides, preferably phosgene, and/or with aromatic dicarboxylic dihalides, preferably benzene dicarboxylic dihalides, by the phase interface process, optionally, with the use of chain stoppers and, optionally, with the use of branching agents which are trifunctional or more than trifunctional.

Other thermoplastic plastic materials which are suitable for use as layer B) of the composites of the invention include the styrene copolymers of one or at least two ethylenically unsaturated monomers (i.e. vinyl monomers) such as, for example, of styrene, α-methylstyrene, ring-substituted styrenes, acrylonitrile, methacrylonitrile, methyl methacrylate, maleic anhydride, N-substituted maleimides and (meth)acrylic esters having from 1 to 8 C atoms in the alcohol component.

The copolymers are resinous and free from rubber.

The preferred styrene copolymers are those comprising at least one monomer from the series styrene, α-methylstyrene and/or ring-substituted styrene, together with at least one monomer from the series acrylonitrile, methacrylonitrile, methyl methacrylate, maleic anhydride and/or N-substituted maleimide.

It is preferred that the relative weight ratios in the thermoplastic copolymer are 60 to 95% by weight of the styrene monomer and 40 to 5% by weight of the other vinyl monomers (based on 100% by weight of the copolymer).

Particularly preferred copolymers are those comprising styrene with acrylonitrile, and, optionally, with methyl methacrylate, of α-methylstyrene with acrylonitrile, and, optionally, with methyl methacrylate, or of styrene and α-methylstyrene with acrylonitrile, and, optionally, with methyl methacrylate.

The styrene-acrylonitrile copolymers are known in the art and can be prepared by radical polymerization, in particular by emulsion, suspension, solution or bulk polymerization. These copolymers preferably have weight average molecular weights ($M_w$), (as determined by light scattering or by sedimentation) of between 15,000 and 200,000 g/mol.

Particularly preferred copolymers also include statistically built-up copolymers of styrene and maleic anhydride, which can be prepared from the corresponding monomer, with incomplete reactions, preferably by a continuous bulk or solution polymerization.

The proportions of these two components of the statistically built-up styrene-maleic anhydride copolymers which are suitable according to the invention can vary within wide limits. The preferred maleic anhydride content is from 5 to 25% by weight.

Instead of styrene, the polymers may also contain ring-substituted styrenes, such as p-methylstyrene, 2,4-dimethylstyrene and other substituted styrenes, such as α-methylstyrene.

The number average molecular weights (number average $\overline{M}_n$) of the styrene-maleic anhydride copolymers can vary over a wide range. The range is preferably from 60,000 to 200,000 g/mol. A limiting viscosity of 0.3 to 0.9 (as measured in dimethylformamide at 25° C.) is preferred for these products.

Graft copolymers are also suitable for use as thermoplastic plastic materials for the layer B). These include graft copolymers which have rubber-like elastic properties and are substantially obtainable from at least two of the following, monomers: chloroprene, 1,3-butadiene, isoprene, styrene, acrylonitrile, ethylene, propylene, vinyl acetate and (meth)acrylic esters having at least 1 to 18 C atoms in the alcohol component. Such polymers of this type include those as described in, for example, "Methoden der organischen Chemie" (Houben-Weyl), Vol. 14/1, Georg Thieme Verlag, Stuttgart, 1961, pp. 393–406. The preferred graft polymers are partially cross-linked and have gel contents of more than 20% by weight, preferably more than 40% by weight, and most preferably more than 60% by weight.

The preferred graft copolymers include, for example, copolymers consisting of styrene and/or acrylonitrile and/or alkyl (meth)acrylates grafted onto polybutadiene, EPDM, butadiene-styrene copolymers and acrylic rubbers of the type described; polybutadienes, butadiene/styrene copolymers or butadiene/acrylonitrile copolymers, polyisobutenes or polyisoprenes grafted with alkyl acrylates or alkyl methacrylates, vinyl acetate, acrylonitrile, styrene and/or alkylstyrenes.

Particularly preferred polymers are, for example, ABS polymers.

The graft copolymers can be prepared by known processes, such as, for example, bulk, suspension, emulsion or bulk-suspension processes.

Thermoplastic polyamides which can be used for layer B) of the composites according to the invention include, for example, polyamide 66 (polyhexamethylene adipinamide), or polyamides of cyclic lactams having 5 to 12 C (carbon) atoms, preferably of lauryl lactam and more preferably of ε-caprolactam=polyamide 6 (polycaprolactam), or copolyamides containing as chief components 6 or 66, or mixtures thereof with the above-mentioned polyamides as chief component. A preferred copolyamide is prepared by activated anionic polymerization, with polycaprolactam as chief component.

On an industrial scale, the activated anionic polymerization of lactams to polyamides is carried out by preparing a solution of catalyst in lactam, optionally, with an impact-resistance modifier and, separately, a solution of an activator in a lactam, the compositions of the two solutions generally being such that combining them in equal proportions produces the required overall formulation. This is not, however, necessary. Different compositions can equally well be chosen such as, for example, a concentrated activator melt and a catalyst melt can be added to a lactam melt. Depending on compatibilities, other additives can be added to the activator melt, the catalyst melt or, optionally, to the lactam melt.

The polymerization is effected by mixing together the individual solutions to form the overall formulation at 80° C. to 200° C., preferably 100° C. to 140° C.

The catalyst is an alkali metal lactam or alkaline-earth lactam, preferably as a solution in lactam, and is most preferably sodium caprolactamate in ε-caprolactam.

The activator for the purpose of the invention can be one of the N-alkyl lactams or acid chlorides or, preferably, aliphatic isocyanates, particularly preferably oligomers of hexamethylene diisocyanate. Both the pure substance and as a solution, for example, in N-methylpyrrolidone, can be used as the activator. A solution of the activator is preferred.

The composites of the invention can be produced in known manner. Layer B) of the composite which comprises a thermoplastic polymers is preferably prepared in advance, and the polyurethane forming reaction system is applied onto the prefabricated thermoplastic polymer comprising layer B), and allowed to react to form the polyurethane layer A) of the composite. Depending on the reactivity of the polyurethane reaction components, these can already be premixed or can be mixed in the known manner, during the deposition or application process. Application of the polyurethane reaction components is typically (and preferably) effected by spraying, knife-coating or calendering. It is also possible to produce the composites according to the invention by means of coextrusion, using known methods.

In particular, the polyurethane reaction components are reacted by the single-stage method or the one-step process, by the prepolymer method, or the semi-prepolymer process.

During the production of the PU (polyurethane) foamed plastic, foaming can also be carried out in accordance with the present invention in closed molds. In this case, the reaction mixture is introduced into a mold which already contains layer B) of the composite. Suitable mold materials are metal, for example, aluminum, or plastics, for example, epoxy resin. The foamable reaction mixture foams in the mold and forms the composite molding. Here, the foaming in the mold can be carried out in such a way that the surface of the molding has a cellular structure. It can also be carried out in such a way that the molding has a solid skin and a cellular core. In this embodiment, one can proceed by introducing foamable reaction mixture into the mold in a quantity such that the foamed plastic formed just fills the mold. However, one can also operate by introducing more of the foamable reaction mixture into the mold than is necessary in order to fill the interior of the mold with foamed plastic. In the latter case, the operation involves "overcharging"; such a procedure is generally known in the art.

In many cases known per se "external release agents", such as silicone oils, are used concomitantly during the foaming in the mold. It is also possible to use so-called "internal release agents", optionally, mixed with external release agents.

Cold-curing foamed plastics can also be produced according to the invention.

Foamed plastics can, of course, also be produced by block foaming or by the per se known double conveyor belt process, which is preferred for the continuous production of the composites according to the invention.

The production of polyurethane composites in a sandwich construction is also preferred. This type of process can be set up as a depot-constructing process or as a cover-constructing process. Both the depot method of construction and the cover method of construction are known per se. In the depot process (filling method of construction), two half-shells (such as, for example, covering layers made of plastic materials) are prepared, then placed in a mold and the cavity between the shells is foamed with the PU foam. In the cover method of construction, the core of PU foam is placed in a mold, and then covered with a suitable covering material such as, for example, with one of the above-mentioned thermoplastics. The cover method of construction is preferred for the construction of sandwich composites.

To produce solid PU materials, the two PU reaction components are caused to react by straightforward mixing at room temperature, as explained above.

A subsequent additional coating of layer A) can be effected by the conventional known processes of painting, metallizing, or by an additional coating with a polymeric layer (such as, for example, like layer A)).

The composites according to the invention are used mainly in the manufacture of motor vehicles, in particular for the interior lining, for example, as coating material for dashboards or for covering pillars.

As used herein, the term molecular weight refers to the number average molecular weight unless otherwise specified.

The invention is explained by means of the following Examples.

EXAMPLES

The content of unreacted reaction components containing ether groups in the polyurethane comprising layer A) of the composite was determined as follows:

The polymeric layer A) was mechanically separated from the composite, mechanically comminuted, and extracted with solvents such as, for example, methylene chloride. It was then possible to determine the unreacted polyether constituents in the extract by means of chromatography in combination with NMR spectroscopy or IR spectroscopy.

The bonding adhesion was tested in the following way, in accordance with DIN 53 357.

The polymeric layer A) was applied in the form of a thin film to the support layer B), in accordance with the relevant DIN Standard. The force of separation during the separation of the composite such as, for example, by a conventional roller peel test in accordance with DIN 53 357, was then measured.

Example 1

A polyurethane layer A) having the following composition was applied to a polymeric support layer B) consisting of polycarbonate based on bisphenol A (number average molecular weight $(M_n)$=12,000 g/mol).

To this end, a trifunctional polyether prepared from propylene oxide and ethylene oxide and having a molar mass $(M_n)$=7,000 g/mol, was thoroughly mixed with 4,4'-(diisocyanatodiphenylmethane (MDI), and water (1% by eight, based on the weight of MDI) in stoichiometric proportions (NCO:OH). To simulate free, unreacted polyether, a polyethylene oxide of the same molar mass $(M_n$=7,000 g/mol) and having unreactive end groups (end groups: diphenylmethyl and methyl) was added in a concentration of 4,000 ppm. The mixture was then poured immediately onto the polycarbonate support layer B), with a casting frame around the polycarbonate support to ensure that a uniform layer thickness was obtained.

Following storage of these composites under the conditions in which the technical product was used (storage for 0 to 14 days at 80° C. and 80% relative humidity), the polyurethane foam layer was removed by peeling off sample strips of 20 mm in width (90° roller peel test), and measuring the separating force in order to determine the bonding adhesion. After the separation of the substrate from the polyurethane layer, the concentration of polyether on the substrate surface was ascertained by X-ray photoelectron spectroscopy (XPS) via determination of the C—O content of the Cls line.

Figure 2:
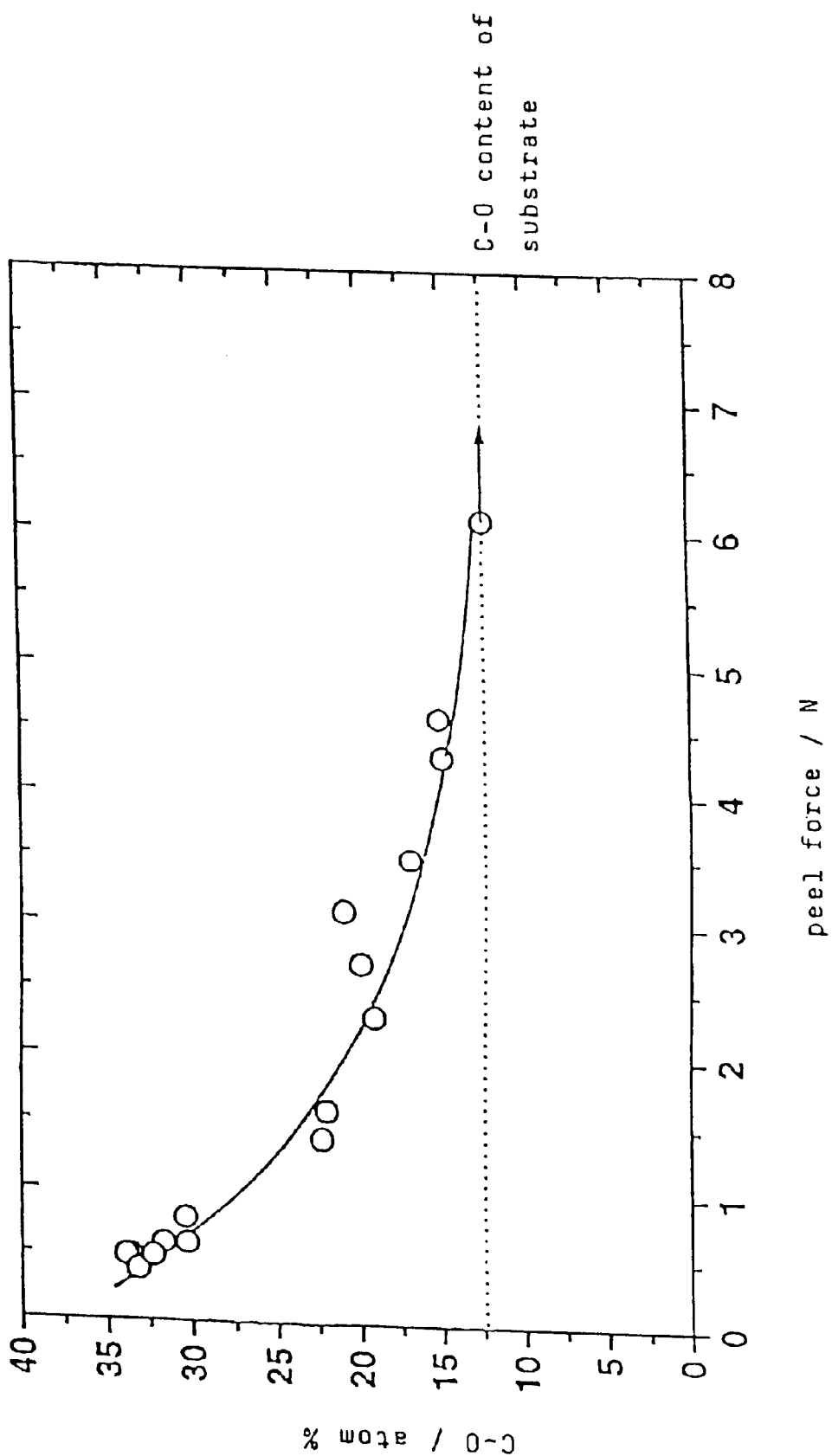
FIG. 2 illustrates that the increase in the concentration of polyether at the interface of the two layers during the course of storage results in a decrease in the bonding adhesion as ascertained by X-ray photoelectron spectroscopy (XPS).

The increase over time in the concentration of polyether on the separated substrate surface is shown in FIG. 1. It can be seen from FIG. 2 that an increase in the concentration of polyether at the interface of the two layers during the course of storage (as determined via the C—O content by XPS on the separated substrate surface) lead to a decrease in the bonding adhesion.

Example 2

Example 1 was repeated, but an unreacted polyether was added in a concentration of 400 ppm (instead of 4,000 ppm); polyethylene oxide, $M_n$=7,000 g/mol, having unreactive end groups: dimethyl and methyl. The increase over time in the concentration of polyether on the separated substrate surface rose after 14 days to C—O contents of 20 atom. % at separating forces of 2.5 N. The lower concentration of unreacted polyether compared with Example 1 thus showed a distinct decrease in the separating force.

Comparison Example 3

Example 1 was repeated, without addition of the proportion of unreacted polyether, for storage times of up to 30 days at 80° C. and 80% relative humidity. The separating force for the determination of the bonding adhesion was >6 N in all cases.

These three Examples show that the bonding adhesion decreases markedly when the unreacted residual content of the component containing ether groups rises above 400 ppm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite material comprising at least two layers of different plastics materials which are directly bonded to each other, comprising:
   A) at least one layer comprising polyurethane, and
   B) at least one layer which is directly bonded to layer A) and comprising a thermoplastic plastic material which is different from A),
      wherein layer A) has a residual content of reaction components containing ether groups of no more than 400 ppm, which result from the polyurethane preparation.

2. The composite material of claim 1, wherein layer A) has a residual content of reaction components containing ether groups of no more than 100 ppm, which result from the polyurethane preparation.

3. The composite material of claim 1, wherein the polyurethane of layer A) of the composite comprises a polyurethane foam or a polyurethane coating.

4. The composite material of claim 1, wherein the thermoplastic plastics material of layer B) of the composite comprises a polycarbonate, a polyester carbonate, a styrene copolymer or of a corresponding graft copolymer, or mixtures thereof.

5. The composite material of claim 1, wherein the thermoplastic plastics material of layer B) of the composite comprises a polyolefin or a polyamide.

6. The composite material of claim 5, wherein said polyolefin is selected from the group consisting of polyethylene, polypropylene and ethylene-propylene copolymers.

7. The composite material of claim 5, wherein said polyamide is selected from the group consisting of polyamide 6 and polyamide 6.6.

8. The composite material of claim 4, wherein the polyurethane of layer A) of the composite comprises a polyurethane foam having a residual content of reaction components containing ether groups of no more than 100 ppm, and the thermoplastic plastics material of layer B) of the composite comprises a polycarbonate.

* * * * *